US008581720B2

(12) United States Patent
Fisher et al.

(10) Patent No.: US 8,581,720 B2
(45) Date of Patent: Nov. 12, 2013

(54) METHODS, SYSTEMS, AND COMPUTER PROGRAM PRODUCTS FOR REMOTELY UPDATING SECURITY SYSTEMS

(75) Inventors: Gerald Fisher, Brainerd, MN (US); Theodore A. Nesse, Stillwater, MN (US); P V S Sathyanarayana Murthy, Andhra Pradesh (IN); Sunil Kumar Neckaraje, Karnataka (IN); Uwe Thomanschefsky, Shoreview, MN (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1300 days.

(21) Appl. No.: 11/282,226

(22) Filed: Nov. 17, 2005

(65) Prior Publication Data
US 2007/0112943 A1 May 17, 2007

(51) Int. Cl.
*G08B 23/00* (2006.01)
(52) U.S. Cl.
USPC .......................................... 340/517; 709/206

(58) Field of Classification Search
USPC .......................................... 709/206; 340/517
See application file for complete search history.

(56) References Cited

U.S. PATENT DOCUMENTS

| 7,340,509 | B2* | 3/2008 | Daum et al. | 709/220 |
| 2005/0027807 | A1* | 2/2005 | Fengler et al. | 709/206 |
| 2005/0272418 | A1* | 12/2005 | Vinson et al. | 455/420 |
| 2006/0010435 | A1* | 1/2006 | Jhanwar et al. | 717/168 |
| 2006/0080653 | A1* | 4/2006 | Siwatu et al. | 717/173 |
| 2007/0085671 | A1* | 4/2007 | Martin et al. | 340/517 |
| 2007/0104129 | A1* | 5/2007 | Yang et al. | 370/329 |

* cited by examiner

*Primary Examiner* — Christopher Brown
(74) *Attorney, Agent, or Firm* — MH2 Technology Law Group LLP

(57) ABSTRACT

Methods, systems, and computer program products for remotely updating security systems is provided. The method includes defining a messaging sequence exchange between a host system and a gateway. The gateway is in communication with a security system panel. The method further includes identifying an update for the security system panel and transmitting the update from the host system to the security system panel via the gateway using the messaging sequence exchange.

17 Claims, 5 Drawing Sheets

METHODS, SYSTEMS, AND COMPUTER PROGRAM PRODUCTS FOR REMOTELY UPDATING SECURITY SYSTEMS

BACKGROUND OF THE INVENTION

The present disclosure relates generally to security systems, and more particularly, to methods, systems, and computer program products for remotely updating security systems.

Security systems provide individuals with a sense of security and comfort. Some systems provide minimal security features (e.g., motion detection lighting), while others provide more extensive security features (e.g., electronic surveillance and automated alarm capabilities). Security system services typically involve monitoring activities at a location specified by a customer via a security system panel installed therein and generating some type of alert if some condition is met (e.g., security alarm activated).

Due to the growth of various communications and related technologies (wireless technologies, security sensing devices, etc.) as well as a continuing need for improved security systems, there is becoming a greater need for systems and processes that can manage these complex security systems.

Security system panels typically include firmware that requires periodic maintenance (e.g., when updates to the firmware are developed or errors are detected that require a patch). Manually updating these systems can be very expensive and labor-intensive in that such activities are provided on site.

What is needed, therefore, is a way to remotely update these security systems as updates and/or fixes become available.

BRIEF SUMMARY OF THE INVENTION

Methods, systems, and computer program products for remotely updating security systems is provided. The method includes defining a messaging sequence exchange between a host system and a gateway. The gateway is in communication with a security system panel. The method further includes identifying an update for the security system panel and transmitting the update from the host system to the security system panel via the gateway using the messaging sequence exchange.

BRIEF DESCRIPTION OF THE DRAWINGS

Referring to the exemplary drawings wherein like elements are numbered alike in the accompanying FIGURES.

DETAILED DESCRIPTION OF THE INVENTION

Exemplary embodiments include methods, systems, and computer program products for remotely updating security systems. Security systems are provided with a gateway that is enabled for communicating with a host system via a defined messaging sequence exchange, as well as standard communications protocols. Updates to the security systems are remotely facilitated via the host system over a network using the messaging sequence exchange and standard communications protocols. The updates may be an enhancement to an existing security system (firmware) or may be a patch file for debugging or correcting an existing security system.

Figure 1:
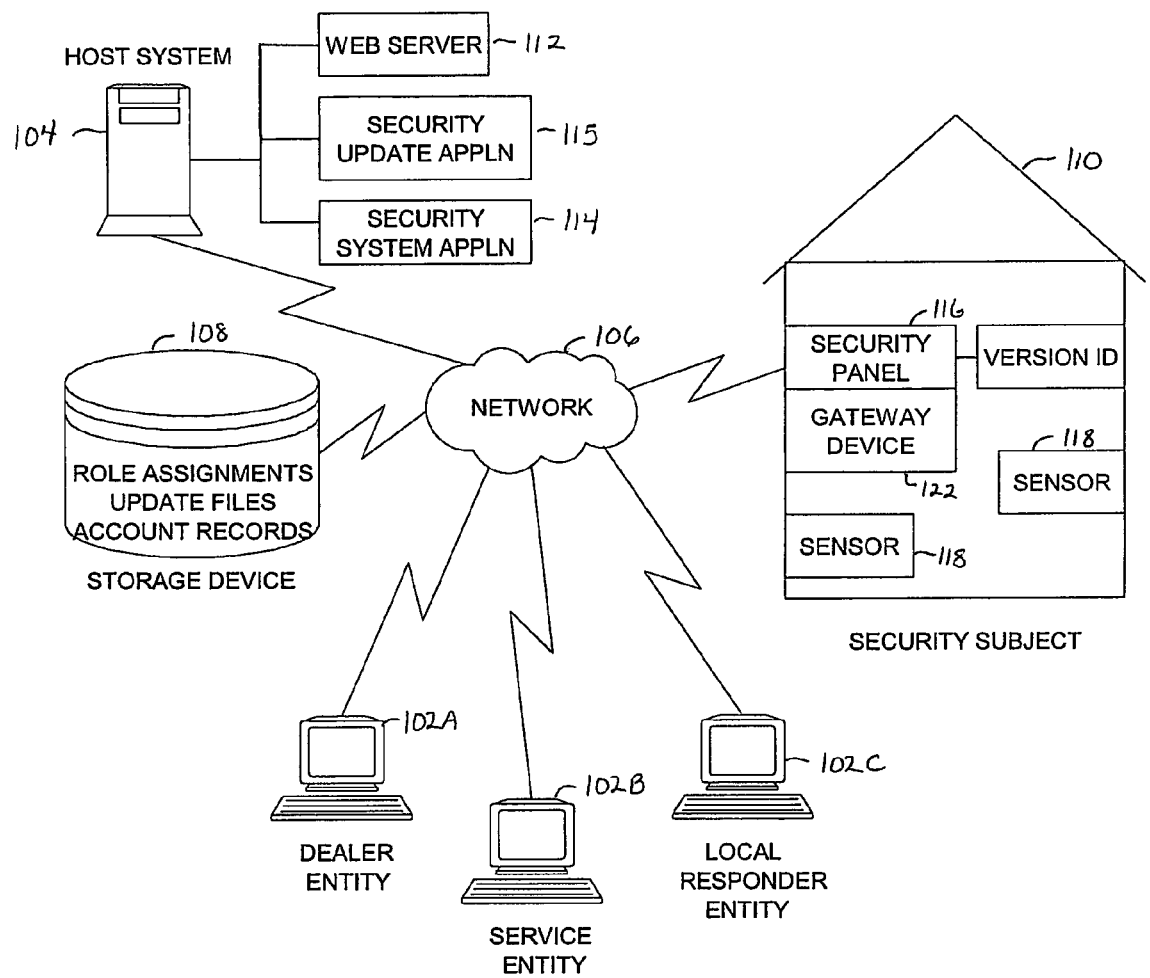
FIG. 1 is a block diagram upon which the security file management system services may be implemented in exemplary embodiments.

The system depicted in FIG. 1 includes user systems 102 through which users at one or more geographic locations may contact a host system 104. The host system 104 executes computer instructions (e.g., via a security system application 114) for establishing and maintaining security accounts and implementing related security functions (e.g., monitoring, reporting, etc.) via a network (e.g., network 106). The user systems 102 are coupled to the host system 104 via one or more networks, such as network 106. The host system 104 may be an application service provider (ASP) for providing security system services, including managing accounts for multiple independent dealers.

The host system 104 provides multi-tiered access to security account information and systems. Tiers include, in order of greatest to least access and control capabilities, an administrator level, a dealer level, a service level, a local responder level, and a security subject level as described herein. The administrator level represents the highest level and has the greatest level of access to dealer accounts, information, and systems. The administrator level may implement security functions via host system 104, such as controlling web-based operation of the security functions and control over the operations and access of all lower level users (e.g., dealers, service entities, local responders, and security subjects). The security system application 114 may be a proprietary tool of an enterprise of host system 104 or may be implemented by the security system application described in U.S. patent application Ser. No. 11/160,598, filed on Jun. 30, 2005, entitled "METHOD, SYSTEM, AND COMPUTER PROGRAM PRODUCT FOR IMPLEMENTING MULTI-TIERED MANAGEMENT OF SECURITY SYSTEMS" (and commonly assigned to the assignees of the present application), the contents of which are incorporated by reference herein in its entirety.

User systems 102A-102C include a dealer entity 102A, a service entity 102B, and a local responder entity 102C. A dealer refers to an entity or individual that hosts security panels under, e.g., a contract monitoring agreement. The dealer monitors the communication and alarms generated by panels (also referred to herein as 'security system panels') at security subject sites for which it is responsible. The dealer dispatches law enforcement to the subject location if needed. These, and other, functions may be implemented via, e.g., a web site provided by the host system 104 and a web server 112. While only one dealer entity is shown in the system of FIG. 1, it will be understood that multiple independent dealer entities may be serviced by the security file management system.

A service entity refers to an entity or individual that services security panels for multiple security subjects under the direction of a dealer. The servicing includes installation, maintenance, and repair of security panels. Each service entity reports to a single dealer entity. The service entity employees are tasked with creating security subject accounts via, e.g., a web site of the host system 104 and web server 112, and may update account information relating to security subjects such as name and address information. The service entity may also configure the parameters within security panels at a subject location (e.g., 110) that represent which sensors are communicating to the security panel within the location and give the sensors names or identifications that may be displayed at the web site. Each service entity may configure multiple employees to access the functions of the security system application 114 as needed.

Local responders refer to individuals or entities responsible for monitoring groups of security subject locations such as a gated community, a condominium, hotel, etc. These typically involve on-site monitoring operations. The service entity or dealer may assign a security panel within a subject location to be monitored by the local responder using, e.g., one or more web pages provided by web server 112 designed to perform this operation. Again, multiple individuals or employees for each local responder entity may be assigned to a dealer via the dealer account.

The security subject 110 refers to an entity or location for which the security file management system services are provided. The security subject may be a home, office, building, organization, complex, etc., and its occupants or authorized representatives are provided with the ability to monitor and control its associated security panel(s). Authorized individuals of the security subject locations may arm/disarm panels, remotely control appliances and lights assigned to panels, setup notification routes to be telephoned or emailed in case of an alarm, etc.

Each of user systems 102A-102C may be implemented using a general-purpose computer executing a computer program for carrying out the processes described herein. The user systems 102 may be personal computers (e.g., a lap top, a personal digital assistant, etc.) or host attached terminals. If the user systems 102 are personal computers, the processing described herein may be shared by the user systems 102 and the host system 104 (e.g., by providing an applet to the user systems 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. One or more user systems 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g. a web browser) to contact the host system 104 through the network 106. In another exemplary embodiment, a user system 102 is connected directly (i.e., not through the network 106) to the host system 104 and the host system 104 is connected directly to or contains the storage device 108.

The storage device 108 includes data relating to accounts (e.g., dealer and security subject accounts), role-based assignments, and file updates (e.g., patch files for security system panels) and may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. Information stored in the storage device 108 may be retrieved and manipulated via the host system 104 and/or via authorized user systems 102.

In exemplary embodiments of the present invention, the host system 104 operates as a database server and coordinates access to application data including data stored on the storage device 108.

The host system 104 depicted in FIG. 1 may be implemented using one or more servers operating in response to a computer program stored in a storage medium accessible by the server. The host system 104 may operate as a network server (e.g., a web server 112) to communicate with the user systems 102. The host system 104 handles sending and receiving information to and from the user systems 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs (e.g., security system application 114, security update application 115) to provide network-based security functions. Processing may be shared by the user systems 102 and the host system 104 by providing an application (e.g., java applet) to the user systems 102. Alternatively, the user systems 102 can include stand-alone software applications for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As described above, security subject 110 refers to the entity or location for which the security file management services are implemented. One or more security panels (e.g., security panel 116) are disposed within security subject 110. Security panel 116 communicates with host system 104 via, e.g. HTML commands and server-side script technology that enables scripts embedded in web pages to be executed by a network server. Security panel 116 refers to a console that includes, e.g., a control panel, keypad, status lights and/or LCD screen, clock functions, alarm, and speaker/microphones. The control panel may also include a processor that enables an authorized representative of security subject 110 to program its internal security system functions and, optionally, access features of the security system application 114. Alternatively, the security system application 114 may be accessed via a personal computer at the security subject location 110 or remotely from a suitable communications device. The security panel 116 may be, for example, a Simon 3 panel by GE Security, Inc., of Arden Hills, Minn.

The security panel 116 also includes a gateway device 122 that communicates with host system 104 via, e.g., HTTP protocols and other specified protocols (e.g., ITI protocols for building a data exchange sequence that enables the communication and security file updates as described further herein. Each security panel 116 has associated therewith a version identification that includes, e.g., a module version, a firmware version and a hardware version. In addition, each gateway device is associated with a security system subject account via the security update application 115.

Sensors 118 are located within or around the security subject 110 and are in communication with the security panel 116. Sensors 118 may include any type of sensing device such as a motion detector, fire/smoke detector, water sensor, temperature sensor, etc. Sensors 118 on windows or glass doors may comprise audio-based units capable of recognizing a pattern of breaking glass across a full audio band. In addition, automated systems such as window/door opening and closing devices or appliances in security subject 110 (e.g., lighting, televisions, or other devices that give the appearance that the security subject is occupied) may be in communication with the security panel 116. Sensors 118 may be located in proximity of the security subject 110, e.g., lighting fixtures on property grounds or gateway. Sensors 118 are in communication with security panel 116 via hardwiring means or wireless means. Additionally, video cameras may be implemented for sensing motion and triggering an alarm at the security panel 116.

As described above, an individual associated with security subject 110 may program security settings into the security application 114 via, e.g., a home computer, a processor associated with the security panel 116, or other suitable processing device. A dealer identification may be programmed into the security panel 116, by e.g., a service entity upon installation, for associating the security panel 116 with a specific dealer account.

Figure 2:
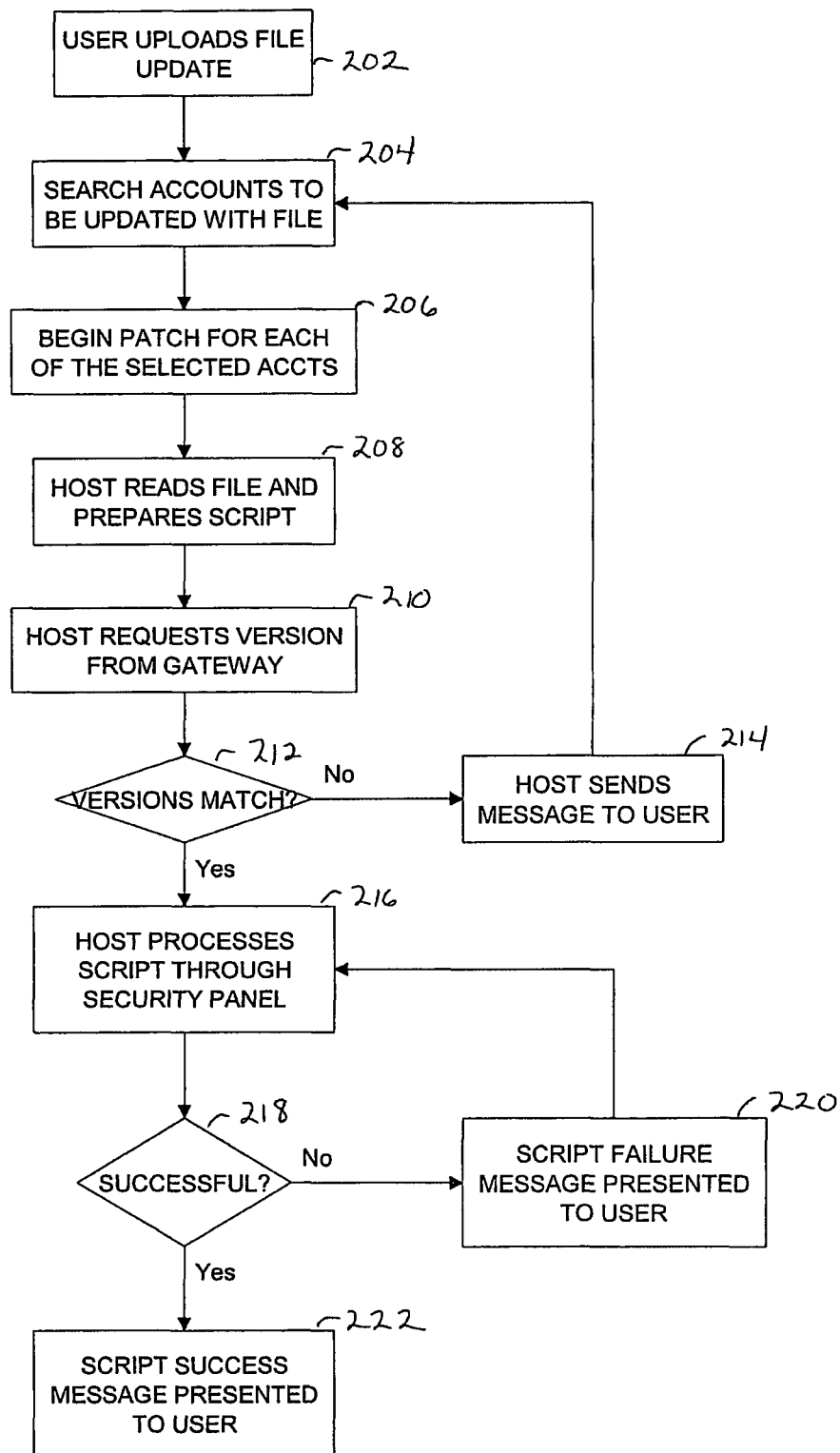
FIG. 2 is a flow diagram describing a process for implementing the security file management system services in exemplary embodiments.

Turning now to FIG. 2, a process for implementing the security file system services will now be described. As indicated above, a messaging sequence exchange is defined for enabling communications between the host system 104 and the security panel 116 via gateway 122. The messaging sequence exchange may include various commands and messages transpiring over a network (e.g., network 106). In addition, the messaging sequence exchange is facilitated over a network using, e.g., standard communications protocols such as TCP/IP. A sample messaging sequence exchange is provided below.

| Gateway | Host | Description | Meaning | Errors |
|---|---|---|---|---|
| Cmd | | General request | Server can send cmd | |
| | Cmd | Patch block | Server sends first patch block | 0 1C: specified patch not found, other transient errors<br>1 1E: message corrupted<br>2 1F: patch message not supported |
| Cmd | | Patch block request | Gateway requesting block of a patch | 3 1C: can't patch now<br>4 1E: message corrupted<br>5 1F: patch message not supported |
| | Cmd | Patch block | Server responding with patch block | 0 1C: specified patch not found, other transient errors<br>1 1E: message corrupted<br>2 1F: patch message not supported |
| Repeat as needed | Repeat as needed | | Continue until all blocks are transferred | |
| Cmd | | Patch results message | Gateway finished requesting blocks | 0 result = 0: patch reception success<br>1 result = 1: gateway aborted patch (try later)<br>2 result = 2: patch reception failed |

Note:
Cmd = a string of letters or numbers representing a command.

Figure 3:
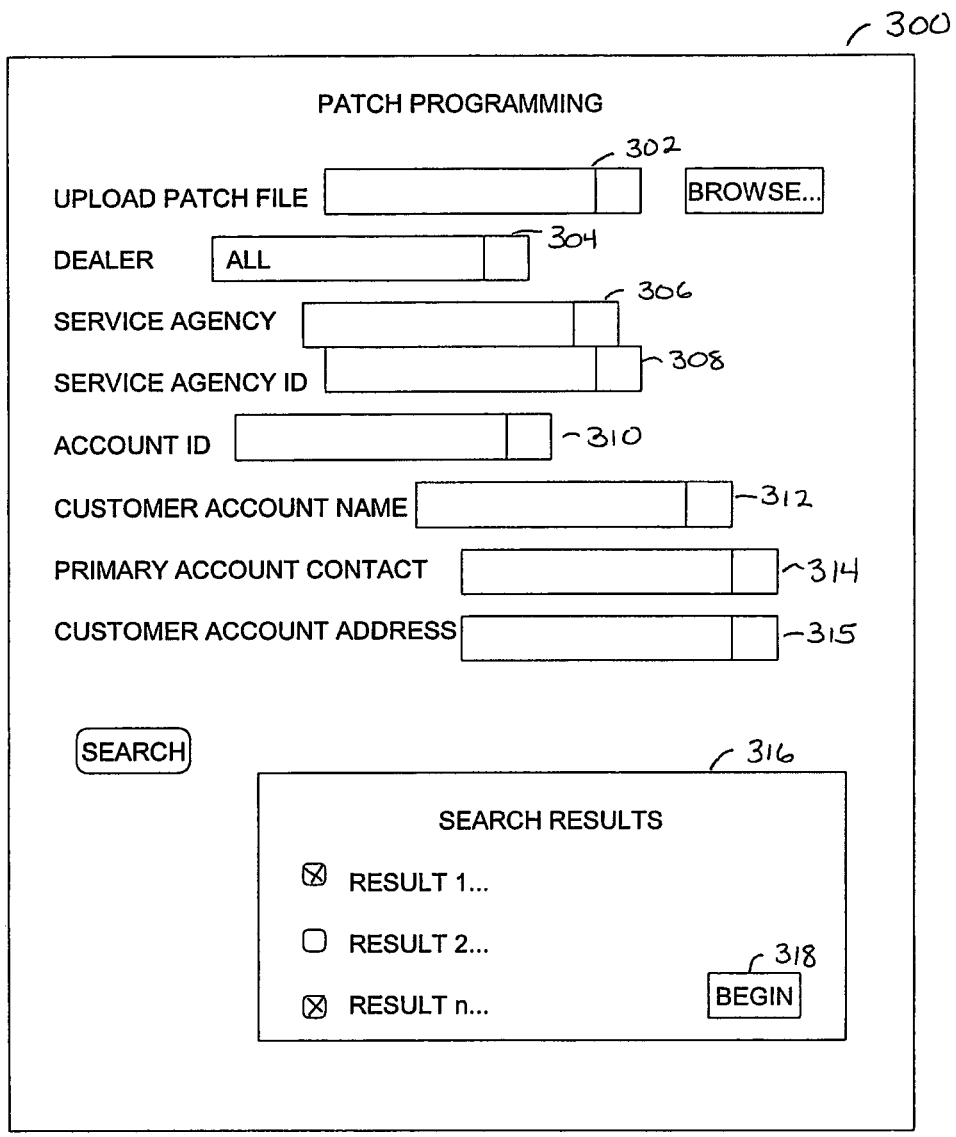
FIG. 3 is a user interface screen provided via the security update application for implementing the security file management system services in exemplary embodiments.

At step 202, an authorized user of one of user systems 102 uploads a patch file to the host system 104 where it is received and stored in storage device 108. The file upload may be implemented via a user interface screen provided by the security update application 115, a sample of which is shown generally in FIG. 3. As shown in FIG. 3, a field 'Upload Patch File' 302 may be utilized for this purpose. The user may then perform a search for any accounts to be updated with the patch file at step 204. As shown in the user interface screen 300 of FIG. 3, the user may search by various fields such as Dealer 304, Service Agency (also referred to as Service Entity) 306, Service Agency ID 308, Account ID 310, Customer Account Name 312, Primary Account Contact 314, Customer Account Address 315, as well as other types of search fields. Once the search has been performed, a list of search results is provided to the user via a subwindow 316 as shown in FIG. 3. The search results may be shown in a grid with a check box against each row for selection. The rows with checkboxes represent the accounts that will be updated.

At step 206, the user selects the BEGIN option 318 to initiate the patch updates for each selection. The security update application 115 reads the patch file and prepares a script by each block size in a command buffer (e.g., reads 16 bytes each line and makes the 64 block to be sent to the gateway) at step 208. At step 210, the security update application 115 sends a request to the gateway for its current version.

At step 212, it is determined whether the version received from the gateway matches the version of the patch file. If not, the security update application 115 sends a message to the user indicating the versions are not a match at step 214. If, on the other hand, the versions are a match, the security update application 115 processes the script through the gateway and corresponding security panel at step 216. A detailed description of this processing is shown and described further in FIG. 4A-4B.

At step 218, it is determined whether the script has been successfully processed. If not, a script failure message is sent to the user at step 220. Otherwise, a script success message is provided to the user at step 222.

Figure 4A:
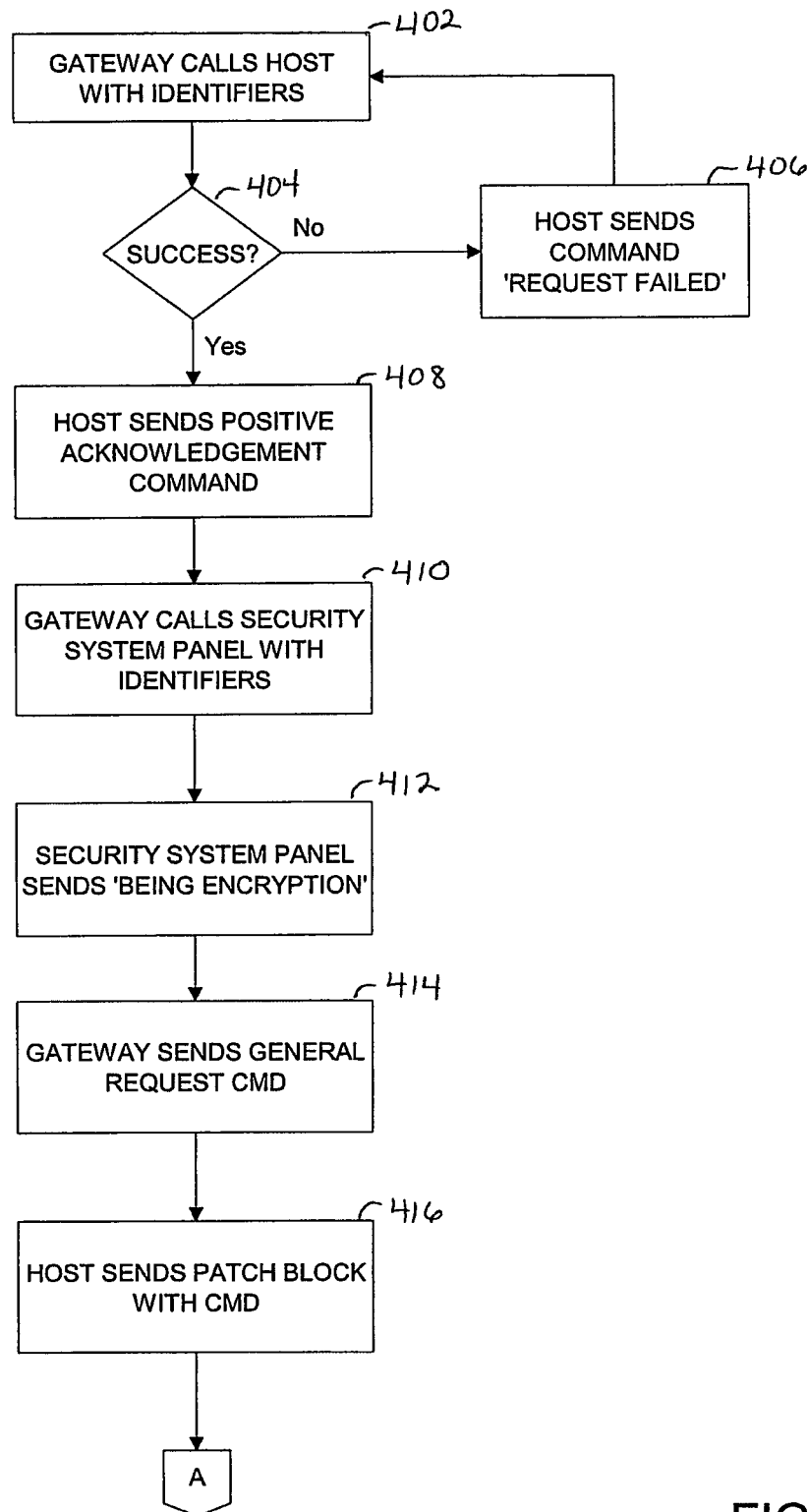
FIG. 4A-4B is a flow diagram describing a process for implementing a file update via the security update application in exemplary embodiments.
Figure 4B:
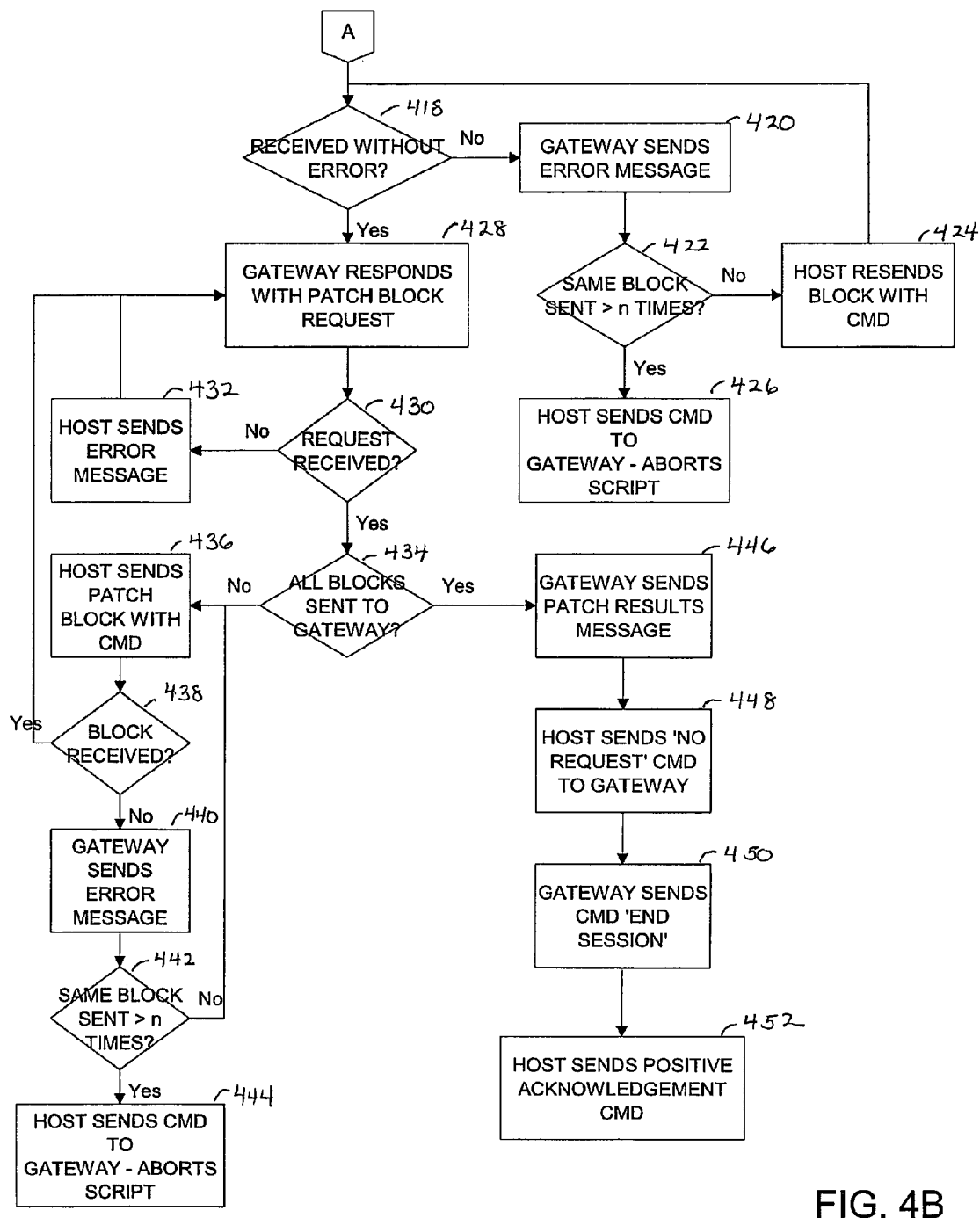

A file update implemented via the security update application 115 and gateway 122 is described in detail with respect to the flow diagram of FIG. 4A-4B and will now be described in accordance with an exemplary embodiment. At step 402, gateway 122 pings the host system 104 (Cmd) providing its identifiers. At step 404, it is determined whether the ping was successful. If not, the host system 104 sends a Command Request Failed (1C) message and the process returns to step 402. Otherwise, the host system 104 sends a positive acknowledgement command (1D) at step 408.

At step 410, gateway 122 contacts security panel 116 along with its identifiers. The security panel 116, in turn, sends a begin encryption command at step 412. The gateway 122 then sends a General Request command to the host system 104 at step 414. In response, the host system 104 sends the patch block along with a command at step 416 and the process continues to step 418 of FIG. 4B.

At step 418, it is determined whether the block has been received by the gateway 122 without error. If not, the gateway sends an error message (e.g., 1C, 1E, 1F) to the host system 104 at step 420. It is then determined whether the same block has been transmitted a specified number of times at step 422. If not, the host system 104 resends the block with a command to the gateway 122 at step 424 and the process returns to step 418. If the same block and command has been sent a specified number of times, then the host system 104 sends a command to the gateway 122 and aborts the script at step 426

Returning to step 418, if the block has been received by the gateway 122 without error, the gateway 122 responds with a patch block request (e.g., a new patch block) at step 428. It is then determined whether the patch block request has been received by the host system 104 without error at step 430. If not, the host system sends an error message (e.g., 1C, 1E, 1F) to the gateway 122 at step 432. Otherwise, it is determined whether all blocks associated with the patch have been delivered to the gateway 122 at step 434. If not, the host system 104 sends a patch block with command as per the gateway request at step 436.

At step 438, it is determined whether the block has been received by the gateway 122 without error. If not, the gateway 122 sends an error message (e.g., 1C, 1E, 1F) to the host system 104. It is then determined whether the same block has been sent a specified number of times at step 442. If so, the host system 104 sends a command to the gateway 122 and aborts the script at step 444. On the other hand, if the same block has not been sent a specified number of times, the process returns to step 436 and the host system sends the patch block with command per the gateway 122 request.

Returning back to step 438, if the block has been received by the gateway 122 without error, the process returns to step 428 where the gateway 122 responds with a patch block request.

Returning back to step 434, if all blocks have been sent to the gateway, the gateway 122 sends a patch results message at step 446. The host system 104 sends a No Request command to the gateway 122 at step 448. The gateway 122 then sends an End Session command to the host system 104 at step 450 and the host system 104, in turn, sends a positive acknowledgement command (1D) to the gateway 122 at step 452.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention.

An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The technical effect of the executable code is to facilitate remote application of security file management systems.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for remotely updating a security system, said method comprising:
    searching a database of panel information for at least one security system panel to update, the database storing information relating to a plurality of security system panels;
    defining a messaging sequence exchange between a user system, a host system, and a gateway remote from the user system, the gateway in communication with a security system panel;
    receiving an update from the user system at the host system, the update comprising a software or firmware update for the security system panel, and wherein the update is stored in a database of updates and the security system panel is one of the plurality of security system panels;
    identifying a version of the update by searching the database of updates;
    requesting the gateway for a current version of the gateway;
    receiving an indication at the host system that the version of the update rr a ches the current version of the gateway;
    transmitting, in response to receiving the indication, the update from the host system to the security panel via the gateway using the messaging sequence exchange;
    determining whether the update is received by the gateway with error; and
    if the update is received without error, applying the update to the security system panel without further input from the user system.

2. The method of claim 1, wherein transmitting she update is performed over a network, the messaging sequence exchange including TCP/IP communications protocols.

3. The method of claim 1, wherein the information relating to the plurality of security system panels includes at least one of:
    a security system panel dealer;
    a security system panel service entity;
    a security system panel local responder entity;
    a security system panel account identifier; and
    a security system panel version identifier.

4. The method of claim 3, wherein the security system panel version identifier includes at least one of
    a module type;
    a firmware version; and
    a hardware version.

5. The method of claim 1, wherein the update is a patch file.

6. A system for remotely updating security systems, comprising:
    a user system;
    a host system;
    a storage device storing updates for security system panels;
    a network link to a gateway remote from the user system, the gateway in communication with one of the security system panels; and
    a security update application executing on the host system, performing:
        searching a database of panel information for at least one security system panel to update, the database storing information relating to a plurality of security system panels;

defining a messaging sequence exchange between the host system and the gateway;
receiving an update from the user system at the host system, the update comprising a software or firmware update for the one of the security system panels, and wherein the update is stored in a database of updates and the security system panel is one of the plurality of security system panels;
identifying a version of the update by searching the database of updates; requesting the gateway for a current version of the gateway;
receiving an indication that the version of the update matches the current version of the gateway;
separating the update into a plurality of blocks in response to receiving the indication;
transmitting a first block of the plurality of blocks to the gateway for delivery via the gateway to the security panel, using the messaging sequence exchange;
determining whether the first block is received by the gateway with error;
if the first block is received by the gateway without error, transmitting a second block of the plurality of blocks from the host system to the gateway using the messaging sequence exchange; and
receiving an end session command upon an indication that each of the plurality of blocks have been received by the gateway, and applying the update to the one of the security update panels without further input from the user system.

7. The system of claim 6, wherein transmitting the first block and the second block of the plurality of blocks is performed over a network link, the messaging sequence exchange including TCP/IP communications protocols.

8. The system of claim 6, wherein the information relating to a plurality of security system panels includes at least one of:
   a security system panel dealer;
   a security system panel service entity;
   a security system panel local responder entity;
   a security system panel account identifier; and
   a security system panel version identifier.

9. The system of claim 8, wherein the security system panel version identifier includes at least one of:
   a module type;
   a firmware version; and
   a hardware version.

10. The system of claim 6, wherein the update is a patch file.

11. The system of claim 6, wherein the gateway resides in the security system panel.

12. A computer program product stored on a non-transitory computer readable storage medium, for remotely updating security systems, the computer program product including instructions for implementing a method, said computer program product programmed to:
   search a database of panel information for at least one security system panel to update, the database storing information relating to a plurality of security system panels;
   define a messaging sequence exchange between a user system, a host system, and a gateway remote from the user system, the gateway in communication with a security system panel;
   receive an update from the user system at the host system, the update comprising a software or firmware update for the security system panel, and wherein the update is stored in a database of updates and the security system panel is one of the plurality of security system panels;
   identify a version of the update by searching the database of updates;
   request the gateway for a current version of the gateway;
   receive an indication that the version of the update, matches the current version of the gateway;
   separate the update into a plurality of blocks in response to receiving the indication;
   transmit a first block of the plurality of blocks from the host system to the gateway for delivery via the gateway to the security panel, using the messaging sequence exchange;
   determine whether the first block is received by the gateway with error;
   if the first block is received by the gateway without error, transmit a second block of the plurality of blocks from the host system to the gateway using the messaging sequence exchange; and
   receive an end session command upon an indication that each of the plurality of blocks have been received by the gateway, and apply the update to the security system panel without further input from the user system.

13. The computer program product of claim 12, wherein the computer program product is configured to transmit the first block and the second block of the plurality of blocks over a network, the messaging sequence exchange including TCP/IP communications protocols.

14. The computer program product of claim 12, wherein the information relating to a plurality of security system panels includes at least one of:
   a security system panel dealer;
   a security system panel service entity;
   a security system panel local responder entity;
   a security system panel account identifier; and
   a security system panel version identifier.

15. The computer program product of claim 14, wherein the security system panel version identifier includes at least one of:
   a module type;
   a firmware version; and
   a hardware version.

16. The computer program product of claim 12, wherein the update is a patch file.

17. The computer program product of claim 12, wherein the gateway resides within the security system panel.

* * * * *